Oct. 8, 1946.　　　A. H. AHRNDT　　　2,408,747
MEAT TENDERING MACHINE
Filed May 14, 1941　　　4 Sheets-Sheet 1
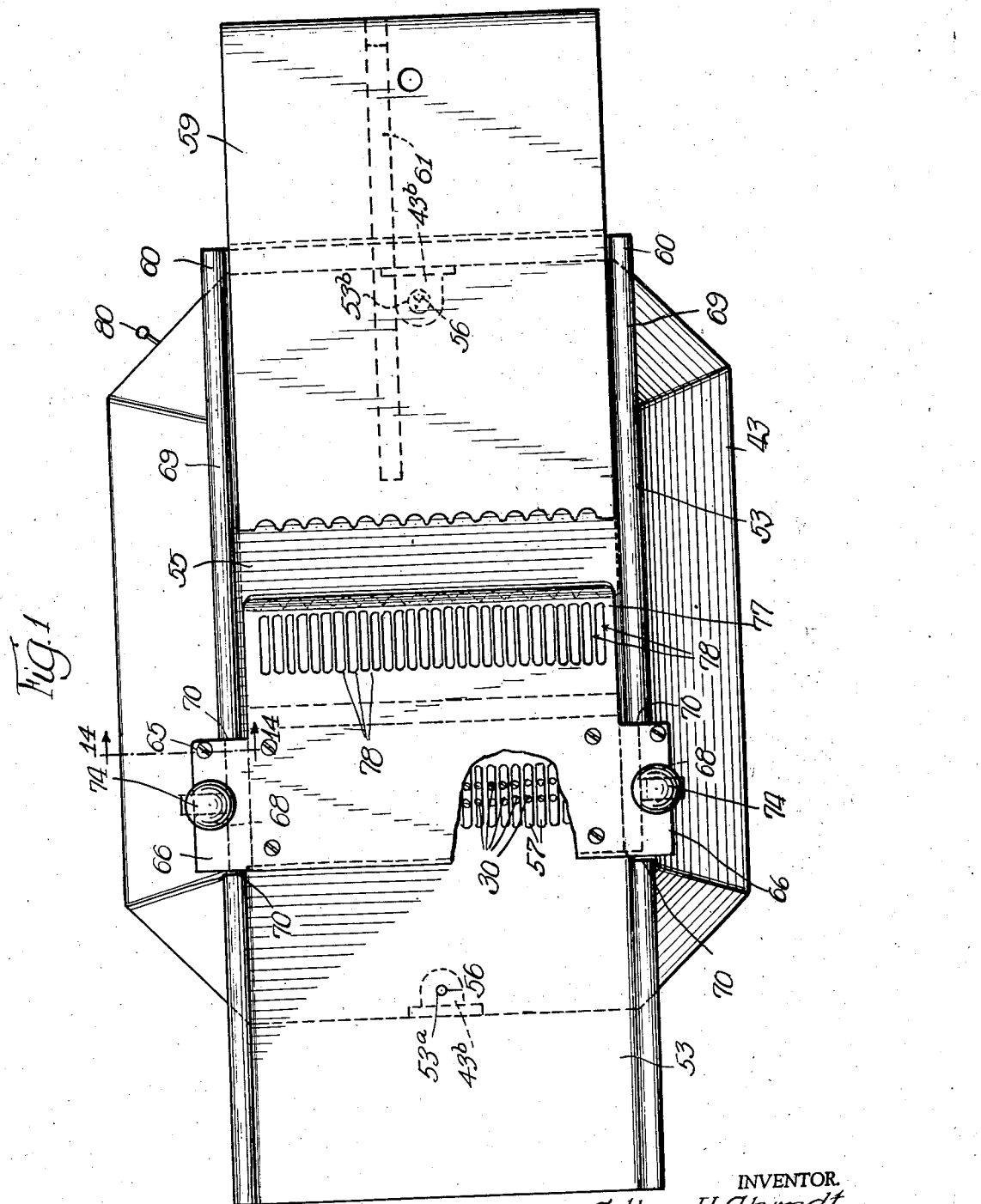
INVENTOR.
Arthur H. Ahrndt
BY Spencer, Margall, Johnston & Cook.
Attys

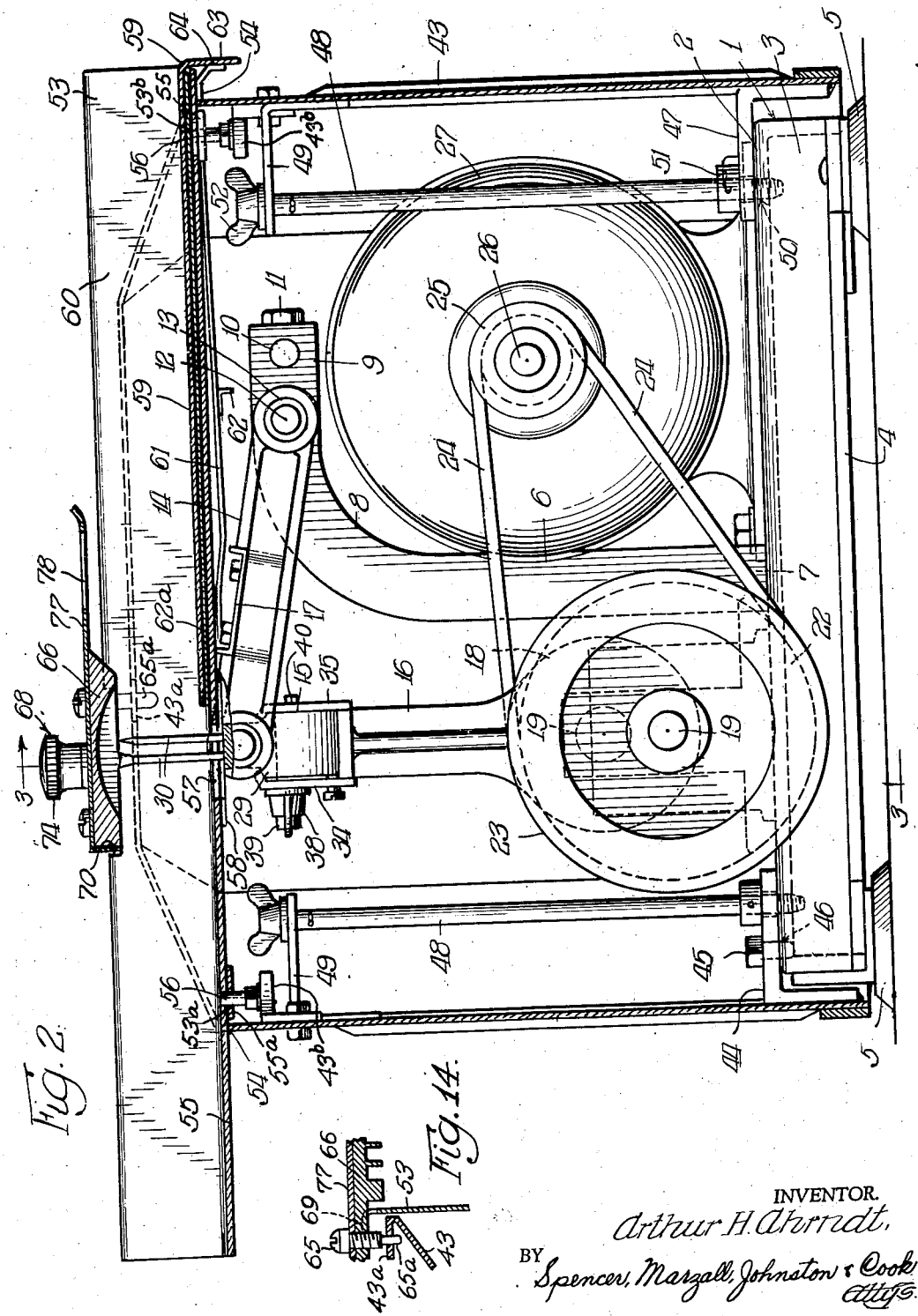

Oct. 8, 1946.    A. H. AHRNDT    2,408,747
MEAT TENDERING MACHINE
Filed May 14, 1941    4 Sheets-Sheet 3
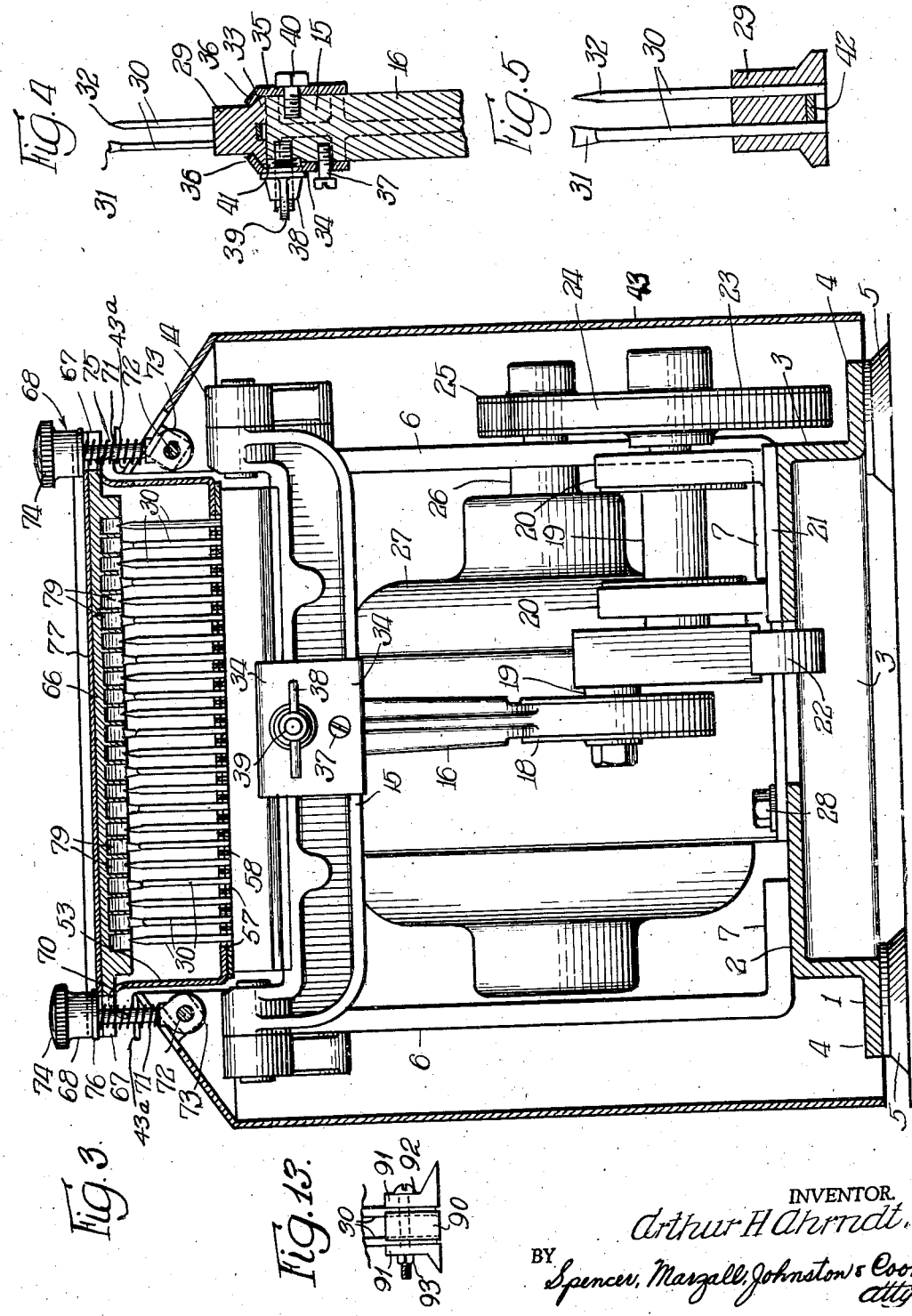
INVENTOR.
Arthur H Ahrndt.
BY Spencer, Maxgall, Johnston & Cook
attys.

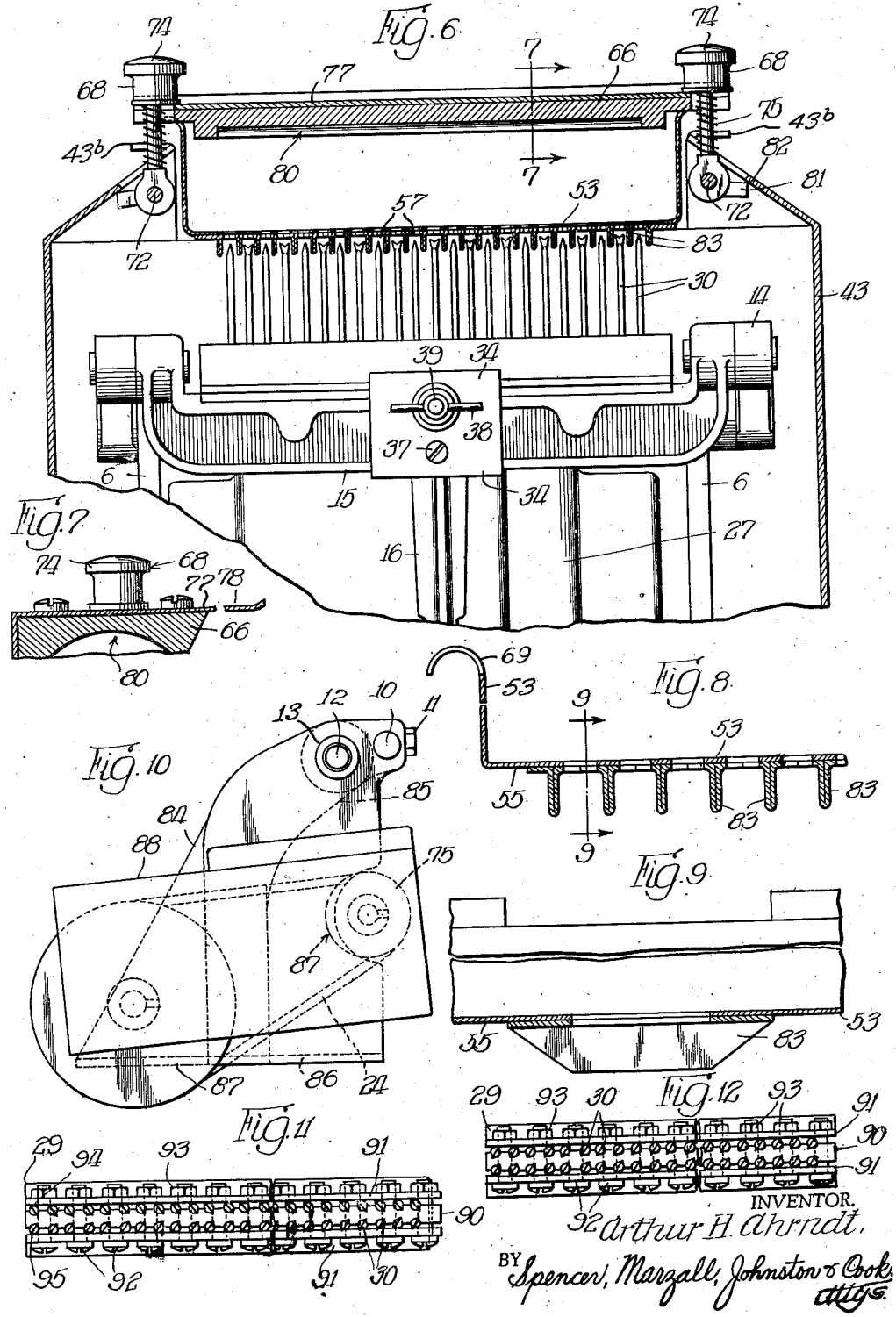

Patented Oct. 8, 1946

2,408,747

UNITED STATES PATENT OFFICE 2,408,747

MEAT TENDERING MACHINE

Arthur H. Ahrndt, La Porte, Ind., assignor to U. S. Slicing Machine Company, La Porte, Ind., a corporation of Indiana Application May 14, 1941, Serial No. 393,381

17 Claims. (Cl. 17—25)

This invention relates to a meat tenderizing machine of the type disclosed in co-pending application Serial No. 277,471, filed June 5, 1939, issued July 6, 1943, as Patent No. 2,323,769 and assigned to the present assignee.

An important object of the present invention is the provision of new and improved means for operatively supporting a crosshead which removably supports a member carrying a plurality of meat tenderizing tines or blades, the crosshead moving through an orbital path to give oscillatory movement to the tines or blades whereby the tines or blades are given vertical movement to pierce and tenderize the substance as well as feeding the substance through the machine.

Another object is the provision of improved means of novel and simplified construction for supporting detachably a tine, blade or tool carrying member to the machine crosshead.

A further object of the invention consists in the provision of new and improved means comprising the location and construction of the various parts and elements to effect the proper movement of the tines or blades for tendering purposes, as well as to perform the necessary feeding action to feed the substance through the machine, the parts being constructed and positioned to operate efficiently.

A still further object of the invention is the provision of new and improved means for mounting various parts upon a particular type of base whereby the outer supporting casing is supported and secured thereto, the casing being adapted for quick and easy removal from the base by the loosening of a pair of threaded members.

Still another object of the invention is the provision of new and improved means for detachably securing the substance trough and the cap plate in proper position with respect to the operating tines or tools whereby the said elements will be always maintained in proper position and securely locked in place by the mere manipulation of exteriorly positioned, manually operated knurled knobs.

Still another object of the invention is the provision of a slidable substance supporting tray operatively connected to the trough to permit the substance, when tenderized, to be removed from proximity of the tines or tools to overcome any danger of the operator coming into contact with these relatively sharp elements.

Numerous other objects and advantages will be apparent throughout the progress of the following specification.

The accompanying drawings illustrate a selected embodiment of the invention and the views therein are as follows:

Fig. 1 is a detail top plan view of the improved tendering machine, parts being broken away for the sake of clearness;

Fig. 2 is a detail longitudinal sectional view thereof;

Fig. 3 is a detail transverse sectional view on the line 3—3 of Fig. 2;

Fig. 4 is a vertical sectional view taken through the crosshead showing the manner in which the tines are removably supported to the crosshead;

Fig. 5 is a detail sectional view through the tine or tool supporting member showing the manner in which the tools or tines are removably secured to the cooperating base or support;

Fig. 6 is a detail transverse sectional view similar to Fig. 3 but showing a modified form of arrangement;

Fig. 7 is a detail sectional view on the line 7—7 of Fig. 6;

Fig. 8 is a detail sectional view of a modified form arrangement on the bottom of the substance supporting trough;

Fig. 9 is a detail sectional view on the line 9—9 of Fig. 8;

Fig. 10 is a detail elevational view of a modified form of supporting bracket and including a belt cover;

Fig. 11 is a detail top plan view of a tine or blade supporting block for removably supporting a modified form of blade arranged in an angular position;

Fig. 12 is a view similar to Fig. 11 but showing the tines or blades arranged in oblique parallelism;

Fig. 13 is a fragmentary detailed end view of the blade supporting block illustrated in Figs. 11 and 12; and Fig. 14 is a fragmentary section taken on the line 14—14 of Fig. 1.

The particular tenderizing or tendering machine herein disclosed for the purpose of illustrating the invention comprises a base 1 having an upper surface 2 surrounded by an integral downwardly depending peripheral flange 3. Longitudinal flanges 4 are turned from the side edges of the peripheral flange 3 and carry resilient shock absorbing feet or supports 5 upon which the weight of the entire machine is supported. Supports 6, 6 are provided with inturned legs 7 which are riveted or otherwise secured to the base 1 to secure the supports 6 rigidly to the base. The upper ends of the supports 6 are curved as indicated at 8, Fig. 2, and terminate in a relatively straight or horizontal part 9. A crossbar or rod 10, Fig. 2, is mounted in the ends 9 of the supports 6 and is locked in operative rigid position by means of the set screws 11 passing through the ends of the members 6 and engaging the rod or crossbar 10 to lock the rod or crossbar 10 rigidly in position whereby a rigid framework is provided to secure certain operative parts of the machine.

A crossrod or bar 12 passes through the supports 6, being mounted in bushings or bearings 13 provided in the ends 9 of the supports 6 adjacent the transverse crossrod or bar 10. The crossrod or bar 12 extends a predetermined distance beyond the outer side edges of the supports 6 and receives spaced links 14 which are rigidly secured thereto. The opposite ends of the links 14 rotatably support a crosshead 15 to which a connecting rod or pitman 16 is integrally connected. A transverse channel member 17 is rigidly secured to the links 14 to secure the links together and to maintain them in proper spaced relationship.

The rod or pitman 16 has a bearing 18 provided at its lower end which engages a crank 19 operatively mounted in spaced bearings 20 which are rigidly secured to the base 1 being integrally connected by a web 21. The crank 19 is provided with a counter-balancing weight 22 and is driven from a pulley 23 rigidly mounted on the outer end of the crank shaft. The pulley 23 is driven by a belt 24 from a driving pulley 25 on the shaft 26 of a motor 27. The motor 27 is secured to the base 1 by bolts 28 passing through elongated slots provided in a part of the motor support to permit adjustment of the motor with respect to the base.

A tine or blade supporting block 29 is removably secured to the upper side of the crosshead 15, and this block 29 carries blades or tines 30 which are adapted to pierce a piece of meat or other substance to be tenderized by breaking up the sinews and tougher portions. The tines or tools 30 project upwardly from the member 29 and have alternating fishtail and chisel points 31 and 32 respectively, Fig. 4, so as to thoroughly break up the sinews and tough portions. These tools 30 move into and out of a piece of meat during movement thereof and the meat is caused to be advanced through the machine by the movement of the tines. The tools or tines 30 are arranged in pairs, those of one pair alternating with those of the next pair. However, the arrangement and shape of the tools may be varied just so that there are a sufficient number of tools properly positioned so as to effectively tenderize the substance.

The tine supporting bar 29 is provided at its lower end with outwardly directed flanges or extensions 33, Fig. 4, which are engaged by front and rear plates 34 and 35 respectively. The plates 34 and 35 have inturned edges or flanges 36 which engage the flanges 33 on the member 29 to hold the member 29 securely in place on the crosshead 15. The front plate 34 is relatively loose, being guided by a guide pin 37, but adapted to be locked in position by a thumb nut 38, threaded on a threaded stud 39 rigidly engaging the crosshead 15. The rear plate 35 is rigidly secured to the crosshead 15 being held in position by means of bolts 40. A spring 41 may be arranged about the stud 39 to urge the front plate 34 away from the crosshead 15 when the thumb nut 38 is loosened. When it is desired to remove the tine supporting bar 29, the thumb nut 38 is loosened, permitting the member 29 carrying all the tines 30 to be instantly removed for replacement, repair, or otherwise.

The lower end of the member 29 may be provided with a slot therein as shown in Fig. 5 to receive a strip member which is driven longitudinally in the slot to engage the lower ends of the tines so that when the tines need replacing, all that is necessary is to remove the strip 42 whereby the pins 30 will be loosened and can be easily withdrawn from their sockets, Fig. 5.

An encircling casing or housing 43 is provided with angles 44 rigidly secured thereto through which pins 45 pass to be received in openings 46 in the top of the base 1 to position properly the casing or housing 43 on the base. The angles 44 rest directly on top of the base and other angles 47, Fig. 2, are also secured to the inside of the casing or housing 43 and also rest on top of the base 1 to support properly the housing on top of the base. The housing 43 is rigidly secured or locked to the base 1 by longitudinal rods 48 loosely received in upper brackets 49 and threadedly engaging threaded openings 50 provided in the top of the base 1. The ends of the members 48 pass through enlarged holes formed in the supporting angle brackets 44 and 47. A collar 51 is rigidly secured to each member 48 near the lower end thereof and rests upon the upper surface of each member 44 and 47 so that when the upper thumb nut 52, which is rigidly secured to each member 48 is turned, the lower threaded end of each member 48 will screw into its hole or opening 50 and lock the rigid angle brackets 44 and 47 securely between the top of the base 1 and the rigidly mounted collar 51 on each rod 48.

A longitudinal substance tray or trough 53 rests upon the ends 54 of the casing or housing 43 and is provided with a pair of spacer openings 53a and 53b in its bottom 55 to receive positioning pins 56, the tops of which are substantially flush with the top of the tray or trough bottom 55. The positioning pins 56 are mounted on brackets 43b attached to the casing 43 adjacent the upper ends 54. The opening 53b may be enlarged as shown Figs. 1 and 2) to facilitate positioning of the trough on the casing or housing. The underside of the trough may also be provided with reinforcing members 55a adjacent the openings 53a and 53b. The bottom 55 of the tray or trough 53 is also provided with slots 57 through which the tools 30 pass during their upward oscillatory movement for piercing the meat to be tenderized. A reinforcing plate 58 is secured to the under side of the bottom 55 to strengthen the bottom at the point where the slots 57 occur, and this reinforcing plate 58 is provided with slots alining with the slots 57 in the bottom 55.

A slide plate 59 is mounted between the side edges 60 of the trough 53 and slides over the top surface of the trough bottom 55. The purpose of this sliding plate 59 is to advance the meat to be tenderized to the cutting tools 30. A flexible strip 61 is secured near its outer end to the bottom of the slidable plate 59 and has its inner end relatively free so that it may be slid through a slot provided in one end of the casing 43. An angle 62 is fixed to this strip 61 so as to prevent the plate 59 from being accidentally pulled out of position, and resilient material 62a Fig. 2, may be applied underneath the sliding plate 59 to prevent rattle between the slide plate 59 and the trough 53. This flexible material supports the slide plate 59 on top of the trough 53. The flexible strip 61 is attached to a downturned flange 63 of the slide plate 59 at the point indicated at 64, Fig. 2. The metal of the strip 61 is inclined adjacent the portion 64 as indicated in Fig. 2 and the flange 63 provides a stop to limit the inward movement of the plate 59. The movement of the plate 59 is thereby limited toward feeding position by the part 63 and outward movement of the plate is limited by the leg of the angle 62, Fig. 2. Outwardly extending lugs 43a (Figs. 2 and 14) are provided on the casing or housing 43 and these lugs are provided with openings to receive pin portions 65a provided on the bottom ends of screws 65 which extend through a cap-plate 66 and center the cap-plate 66 properly with respect to the tines or tools 30. The cap-plate 66 is notched at its outer ends as indicated at 67 to receive locking members 68 to lock securely the cap-plate in position on the housing. The cap-plate 66 is adapted to be supported on the side edges of the trough 53, the rounded side edges 69 of the trough being cut away as indicated at 70 to receive a part of the cap-plate and to position properly the cap-plate with respect to the trough 53.

The locking members 68 comprise threaded members 71 pivoted at 72 to lugs 73 formed inwardly of the housing 43 whereby the members are free to be swung on their pivots 72 outwardly away from the cap-plate 66. The cap-plate 66 is locked in position by the knurled thumb nuts 74 at the threadedly engaging outer ends of the threaded stems 71. A spring 75 is adapted to encircle each threaded member 71 to assist in maintaining a flexible washer 76 arranged beneath the heads 74. These flexible washers 76 are for the purpose of eliminating sounds and rattle during the operation of the machine.

The cap-plate 66 may include an over-hanging extension 77 so as to prevent the operator's hand from coming too close to the violently operating piercing tines 30. This extension 77, however, is provided with a plurality of spaced elongated slots 78 so that the operator may have a view of the substance as it is being shifted or moved toward the operating tines.

The cap-plate 66 has its lower face provided with spaced elongated arcuate slots or channels 79 to permit freedom of movement of the tool points or ends, and while the particular cap-plate 66 herein shown is made of metal, it is to be understood that it may be made of wood or any other suitable or desirable material.

In Figs. 6 and 7 a modified form of cap-plate 66 is shown. This cap-plate 66 is substantially the same as the previously described cap-plate except the spaced ridges are omitted leaving the surface of the cap-plate smooth and unobstructed as indicated at 80, Figs. 6 and 7, from one end to the other.

The locking members 68, as shown in Fig. 6, may be provided with an extension or tail pieces 81 which engage the inner side of the frame 43, as indicated at 82, Fig. 6, to prevent these members from tipping over in the path of the tines or blades when the cap-plate 66 has been removed.

The under side of the tray or trough 53, Figs. 6, 8, and 9, may be provided with downwardly projecting members 83. These projections or extensions 83 are in the form of fins and are arranged on the under side of the bottom 55 of the tray 53. The fins 83 are arranged below the bridges in the plate on each side of the slots, through which slots the tines or blades 30 pass. The lowermost movement of the blades or tines is such that the upper ends thereof will always be above the lowermost edges of the fins. These fins include the function of preventing the tines from striking the bridge between the slots should any of the blades or tines become bent or shifted for any reason. Should the tines become bent or shifted, the fins will act as guides to steer the blades or tines through the slots. The blades 30, therefore, will be prevented from coming in contact with the bridges between the slots and will be caused to stay between the said bridges. It is to be understood, of course, that the fins will not ordinarily be engaged by the blades or tines, but should damage occur to the blades, the fins will act as guide means. This guiding function is only a temporary precaution as the function of the fins is to guide the blades in case of accidental shifting or bending of the blades and is in no way remedial. Should the blades become bent, the operator will know a repair is necessary, but severe damage will be averted because of the guiding action of the fins steering the improperly positioned blades into the slots.

In Fig. 10 there is shown a modified form of bracket which may be used to replace the brackets or supports 6 heretofore described. These brackets 84 and 85, Fig. 10, have relatively long bases 86 and 87 to provide a firm support and to permit for perfect alignment for the cross shaft 12 and cross pin 10. The particular brackets 84 and 85 are adapted to be arranged opposite each other, one bracket being arranged on one side of the machine and the other bracket on the other side. The bracket adjacent the motor may be provided with a cut-out 87 for the motor pulley 25. On the braket adjacent the motor there may be provided a belt cover 88 to prevent any scraps which may fall through the trough 53 from falling into the motor belt 24.

The supporting block for supporting the pins or tines may be made in the form of a central supporting member 90 to receive the blades 30, side elements or side locking bars 91 may be provided to lock the tines or blades 30 in locked position, the tines or blades 30 being lockingly secured in position by means of the spaced bolts 92 and their cooperating nuts 93, Figs. 11 and 12. In Fig. 11, one row 94 of tines or blades 30 have their cutting edges located at an angle running from upper left to lower right, while the other row 95 of the tines or blades 30 may have their cutting edges relatively at right angles to those in row 94. The cutting edges of the blades 30 in the row 95 running in a direction from the lower left-hand toward the upper right-hand side. The blades 30 shown in Fig. 12 have their cutting edges each running in the same direction. The arrangement of the blades is such that in one case, Fig. 11, they form a herringbone pattern in delicating the meat, while in another embodiment, Fig. 12, the blade edges are relatively parallel.

The invention provides an exceedingly sturdy, positively operating tenderizing device capable of being readily assembled and constructed to considerably reduce vibration. The parts are relatively few and simple and attached so as to provide a rigid and durable machine. The manner in which the crosshead is supported and operated provides for relatively smooth operation. The outer housing 43 is adapted to be made of a material which can be easily and readily kept clean and it is secured to the base in a novel manner whereby removal can be effected by merely loosening two screw members. The trough is mounted in position on top of the casing so as to support the casing rigidly and to assure its proper position at all times so that there can be no interference with the operating tines. The cap-plate is adapted to be properly positioned at all times but can be quickly removed by merely loosening the side locking members 68 by turning the screw knobs 74. The entire machine, therefore, is constructed and arranged so that the various parts can be removed for cleaning purposes with the least amount of effort.

The provision of the sliding plate 59 provides the operator with safety means for feeding the substance to the tines for tenderizing the meat. The operation of the crosshead is such that the tines, as they move upwardly, approach the feeding end of the machine and then move away from feeding position during their continued piercing operation as well as while they are retracting so as to feed the meat continuously without any additional feeding mechanism. The electrical conductors which lead to the motor preferably pass through an insulated opening formed through one end of the casing and are electrically connected to a switch also arranged inside of the casing. The switch has a switch operating lever 80 extending through the casing as clearly shown in Fig. 1.

Changes may be made in the form, construction, and arrangement of the parts without departing from the spirit of the invention; and the right is hereby reserved to make all such changes as fairly fall within the scope of the following claims.

The invention is hereby claimed as follows:

1. A machine having a relatively low base, tendering mechanism including a plurality of tines supported on the base and extending upwardly therefrom, a housing about said mechanism, a trough removably mounted on a top portion of said housing, and means removably fastening the housing to the base, said means comprising elongated members extending downwardly from adjacent said top portion of the housing so as to be readily accessible upon removal of said trough, said members having threaded ends and impinging portions engageable with the base and housing to removably lock the housing to the base.

2. A tendering machine comprising a crosshead, an elongated meat tendering tool-carrying member removably mounted on the cross-head, means on the cross-head for locking said member to the cross-head, tools removably carried by said member along the length thereof, and means to lock said tools in position in the member, said last named means including a recessed channel provided in the member along its length, and at least one elongated locking strip forced lengthwise into said channel and frictionally engaging side parts of a plurality of the tools.

3. A meat tendering machine comprising a housing, a meat supporting trough supported by the housing, a cap-plate supported by the housing and recessed into the sides of the trough, said cap-plate holding the trough in position, and locking means on the housing and engaging the plate to lock the plate and trough in place.

4. A meat tendering machine comprising a housing, a meat supporting trough supported by the housing, a cap-plate supported by the housing and recessed into the sides of the trough, said cap-plate holding the trough in position, locking means on the housing and engaging the plate to lock the plate and trough in place, said locking means including screw members pivotally mounted on the housing, and thumb nuts on the ends of the screws and adapted for locking engagement with the cap-plate.

5. A meat tendering machine comprising a housing, a meat supporting trough supported by the housing, a cap-plate supported by the housing and recessed into the sides of the trough, said cap-plate holding the trough in position, locking means on the housing and engaging the plate to lock the plate and trough in place, a tray slidably mounted on top of the trough, and means to limit the sliding movement of the tray.

6. A meat tendering machine comprising meat tendering tools, means for moving said tools through an orbital path, a housing for said machine, a trough mounted on said housing, a cap-plate mounted on said trough above the tools and acting as a backing for the substance to be tendered, means for locking said cap-plate to the housing, said means comprising inter-engaging means on the cap-plate and the housing for locking the cap-plate to the housing, and said means providing for locking said trough to the housing.

7. A meat tendering machine comprising meat tendering tools, means for moving said tools through an orbital path, a housing for said machine, a cap-plate spaced above the tools and acting as a backing for the substance to be tendered, and means for locking said cap-plate to the housing, said means comprising notches provided on the side edges of the cap-plate, pivotally mounted screws mounted on the housing and receivable in said notches, thumb nuts on the ends of said screws, and means cooperating between said screws and said housing to prevent the screws from entering into the path of said tools.

8. A meat tendering machine comprising a casing, a cap-plate for backing the substance to be tendered removably fastened to the casing, and means for locking the cap-plate to the casing comprising oppositely disposed members pivotally mounted on the casing, members threadedly engaging said last named members and adapted to lock said cap-plate to the casing, and extensions on said pivotal members adapted to engage said casing to limit the pivotal movement of the members.

9. A meat tendering machine comprising a housing, a meat supporting trough supported by the housing, a cap-plate supported by the housing and recessed into the sides of the trough, said cap-plate holding the trough in position, and locking means interengaging the housing and plate to lock the plate and trough together.

10. A meat tendering machine comprising a housing, a meat supporting trough supported by the housing, a cap-plate supported by the housing and recessed into the sides of the trough, said cap-plate holding the trough in position, and locking means interengaging the housing and plate to lock the plate and trough together, said locking means including pivotally mounted screw members, and thumb nuts on the ends of the screw members.

11. A machine having a relatively low base, tendering mechanism including a plurality of outwardly projecting tines supported by the base, a housing about said mechanism, a trough removably mounted on a portion of said housing, interengaging means between said trough and housing to position said trough on the housing, and means removably fastening the housing to the base, said means comprising members extending from adjacent said portion of the housing so as to be readily accessible upon removal of said trough, said members threadedly engaging the base, and means on said members engageable with a part of the housing to lock the housing to the base.

12. A tendering machine comprising a base, a crank-arm centrally positioned on said base, a pitman extending upwardly from said crank-arm, a cross-head rigidly mounted on said pitman, a meat tendering tool-carrying member removably mounted on the top of said crosshead, means on the cross-head adapted for locking said member to the cross-head, a housing removably mounted on said base for enclosing said tendering mechanism, a trough removably mounted on a top portion of said housing, and means removably fastening said housing to said base, said means comprising elongated members extending downwardly from adjacent said top portion of the housing so as to be readily accessible upon removal of said trough, said members having threaded ends and impinging portions engageable with the base and housing removably to lock the housing to the base.

13. A tendering machine comprising a cross-head, a meat tendering tool-carrying member removably mounted on the cross-head, tools removably carried by said member, means to lock said tools in position in the member, and means for locking said member on the cross-head, said last named means comprising a pair of plate members, a guide member for one of said plate members, screw means separate from said guide member for drawing said plate members into locking engagement with the tool-carrying member, and spring means tending to urge said one plate member outwardly on said guide member.

14. A meat tendering machine comprising a housing, tendering implements in the housing, a meat supporting trough supported on said housing and extending on opposite sides of said tendering implements, means to mount the trough in fixed position on the housing, a tray slidable on said trough, means to limit the slidable movement of said tray to a portion only of the length of the trough, and resilient means attached to said tray and adapted to engage the underside of said trough for normally maintaining said tray in position on said trough.

15. A tendering machine comprising a base, a housing, a trough mounted upon an upper portion of the housing, a cap-plate mounted on said trough, locking means interengaging said housing and plate to lock said plate and trough in place on the housing, and means removably fastening said housing to said base comprising elongated members extending downwardly from a top portion of the housing so as to be readily accessible upon removal of said trough, said members having threaded ends and impinging portions engageable with the base and the housing removably to lock the housing to the base.

16. A meat tendering machine comprising a casing, a cap-plate for backing the substance to be tendered removably fastened to the casing, and means for locking the cap-plate on the casing comprising oppositely disposed members interengageable between the casing and plate, and interengaging means between said casing and said locking means to limit movement of the locking means inwardly of said casing.

17. A tendering machine comprising a housing, a supporting trough mounted on said housing, a cap-plate mounted on said trough, and locking means interengaging said housing and plate to lock the plate in position on said housing, said cap-plate and said locking means providing also to clamp said trough in position on said housing.

ARTHUR H. AHRNDT.